United States Patent
Lee et al.

(10) Patent No.: US 11,424,433 B2
(45) Date of Patent: Aug. 23, 2022

(54) METHOD FOR MANUFACTURING ELECTRODE

(71) Applicant: LG CHEM, LTD., Seoul (KR)

(72) Inventors: Taek Soo Lee, Daejeon (KR); Jung Min Yang, Daejeon (KR); Sang Hoon Choy, Daejeon (KR); Cheol Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 335 days.

(21) Appl. No.: 16/615,373

(22) PCT Filed: Nov. 20, 2018

(86) PCT No.: PCT/KR2018/014279
§ 371 (c)(1),
(2) Date: Nov. 20, 2019

(87) PCT Pub. No.: WO2019/143011
PCT Pub. Date: Jul. 25, 2019

(65) Prior Publication Data
US 2020/0161627 A1    May 21, 2020

(30) Foreign Application Priority Data
Jan. 19, 2018 (KR) .................. 10-2018-0007082

(51) Int. Cl.
| H01M 4/04 | (2006.01) |
| H01M 4/70 | (2006.01) |
| H01M 50/531 | (2021.01) |

(52) U.S. Cl.
CPC .......... H01M 4/0404 (2013.01); H01M 4/70 (2013.01); H01M 50/531 (2021.01)

(58) Field of Classification Search
CPC .......................... H01M 10/058; H01M 10/04
See application file for complete search history.

(56) References Cited

U.S. PATENT DOCUMENTS

| 9,640,760 B2 | 5/2017 | Gabel et al. |
| 2011/0131799 A1 | 6/2011 | Ito et al. |
(Continued)

FOREIGN PATENT DOCUMENTS

| EP | 2799154 A1 | 11/2014 |
| JP | 2001-6664 A | 1/2001 |
(Continued)

OTHER PUBLICATIONS

Machine Translation of Hyun (Year: 2017).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A method for manufacturing an electrode having an irregular shape through a simple process while minimizing the amount of wasted electrode active material is provided. The method results in first to third coating areas formed to be spaced apart from each other on a collector, a plurality of fourth coating areas formed between the first coating area and the second coating area, and a plurality of fifth coating areas formed between the second coating area and the third coating area. The plurality of fourth coating areas and the plurality of fifth coating areas are dislocated from each other when viewed from one side in a width direction of the collector.

8 Claims, 4 Drawing Sheets

(56) References Cited

U.S. PATENT DOCUMENTS

| | | |
|---|---|---|
| 2014/0325833 A1 | 11/2014 | Ito et al. |
| 2015/0291859 A1 | 10/2015 | Takamura et al. |
| 2016/0079533 A1 | 3/2016 | Gabel et al. |
| 2018/0254472 A1 | 9/2018 | Ahn et al. |
| 2019/0103602 A1 | 4/2019 | Otsuka et al. |
| 2020/0343532 A1* | 10/2020 | Aya ................. H01M 4/485 |

FOREIGN PATENT DOCUMENTS

| | | | |
|---|---|---|---|
| JP | 2001-110408 A | 4/2001 | |
| JP | 2014-22149 A | 2/2014 | |
| JP | 5976833 B2 | 8/2016 | |
| JP | WO2019077943 A1 * | 11/2020 | ............. H01M 4/04 |
| KR | 10-1599490 B1 | 3/2016 | |
| KR | 10-1641095 B1 | 7/2016 | |
| KR | 10-2017-0000079 A | 1/2017 | |
| KR | 10-1744041 B1 | 6/2017 | |
| KR | 10-2017-0105752 A | 9/2017 | |
| KR | 10-2017-0140635 A | 12/2017 | |
| WO | WO 2017/208537 A1 | 12/2017 | |

OTHER PUBLICATIONS

International Search Report (PCT/ISA/210) issued in PCT/KR2018/014279, dated Feb. 22, 2019.
Extended European Search Report for European Application No. 18901651.2, dated Jun. 30, 2020.

* cited by examiner

METHOD FOR MANUFACTURING ELECTRODE

CROSS-REFERENCE TO RELATED APPLICATION

The present application claims the benefit of the priority of Korean Patent Application No. 10-2018-0007082, filed on Jan. 19, 2018, which is hereby incorporated by reference in its entirety.

TECHNICAL FIELD

The present invention relates to a method for manufacturing an electrode, and more particularly, to a method for manufacturing an electrode having an irregular shape.

BACKGROUND ART

An electrode assembly is provided in a secondary battery that is repeatedly chargeable and dischargeable. The electrode assembly has a structure, in which a positive electrode, a separator, and a negative electrode are alternately disposed, to receive (charge) electric energy from the outside or supply (discharge) the electric energy to the outside.

As electronic devices are diversified in kind and miniaturized, it is required that the secondary battery is also diversified in shape in comparison with the secondary battery according to the related art. Thus, the shape of the electrode assembly is also required to have an irregular shape in comparison with the electrode assembly according to the related art.

For this, an electrode constituting the electrode assembly has to be also irregular in shape. For example, in order to manufacture a secondary battery having an L shape, the electrode assembly has to also have an L shape. Thus, it is necessary to manufacture an L-shaped electrode.

For this, according to the related art, an electrode is cut first into a rectangular shape, and then, a portion of the electrode is cut to finally manufacture an L-shaped electrode. Alternatively, two kinds of rectangular electrodes having sizes different from each other are manufactured and then attached to each other to finally manufacture an L-shaped electrode. However, in the case of the first method, there is an electrode active material that is discarded without being used in the electrode assembly to cause material waste. In the case of the second method, the two kinds of electrodes have to be manufactured through separate processes, and thus, the process of manufacturing the electrode becomes complicated.

DISCLOSURE OF THE INVENTION

Technical Problem

Thus, an object to be solved by the present invention is to manufacture an electrode having an irregular shape through a simple process while minimizing an amount of wasted electrode active material.

Technical Solution

To achieve the above object, according to one aspect of the present invention, provided is a method for manufacturing an electrode, the method including: preparing a collector; applying an electrode active material on a surface of the collector; and cutting the collector to manufacture a plurality of electrodes, wherein applying the electrode active material layer includes: forming a first coating area, a second coating area, and a third coating area on the collector, each of the first to third coating areas respectively have a first length, a second length, and a third length, each of the first to third lengths being substantially equal to each other, and the first to third coating areas are spaced apart from each other in a width direction of the collector that is perpendicular to the first length; forming a plurality of fourth coating areas, each of which has a fourth length that is less than the first length and which are spaced apart from each other in a longitudinal direction of the collector that is perpendicular to the width direction of the collector and disposed between the first coating area and the second coating area; and forming a plurality of fifth coating areas, each of which has a fifth length that is less than the third length and which are spaced apart from each other in the longitudinal direction of the collector and disposed between the second coating area and the third coating area, wherein the plurality of fourth coating areas and the plurality of fifth coating areas are dislocated from each other when viewed from one side in the width direction of the collector.

In cutting the collector, each of the electrodes of the plurality of electrodes may comprise a portion of two areas of the first to third coating areas and one of the fourth coating areas of the plurality of fourth coating areas or one of the fifth coating areas of the plurality of fifth coating areas.

Each of the first coating area and the third coating area may have a width greater than that of the second coating area.

Cutting the collector may include cutting the collector so that a non-coating portion which is not coated with the electrode active material is formed on the plurality of electrodes, and wherein the non-coating portion is formed from a non-coating area between the second coating area and the third coating area when an individual electrode of the plurality of electrodes includes a portion of the first coating area, a portion of the second coating area, and one of the fourth coating areas of the plurality of fourth coating areas and is formed from a non-coating area between the first coating area and the second coating area when the individual electrode of the plurality of electrodes includes a portion of the second coating area, a portion of the third coating area, and the one of the fifth coating areas of the plurality of fifth coating areas.

Cutting the collector may include cutting the collector so that the plurality of electrodes are coated with the electrode active material on all areas thereof except for the non-coating portion.

Cutting the collector may include: when individual electrodes of the plurality of electrodes comprise a portion of the first coating area, a portion of the second coating area, and the one of fourth coating areas of the plurality of fourth coating areas, cutting the collector so that a recess part is recessed toward the first coating area; and, when individual electrodes of the plurality of electrodes comprise a portion of the second coating area, a portion of the third coating area, and one of fifth coating areas of the plurality of fifth coating area, cutting the collector so that a recess part is recessed toward the third coating area.

In forming the fourth coating areas, the plurality of fourth coating areas may be connected to the first coating area and the second coating area; and, in forming the fifth coating areas, the plurality of fifth coating areas may be connected to the second coating area and the third coating area.

Cutting the collector may include cutting the collector so that areas an area of each electrode of the plurality of electrodes, which are coated with the electrode active material, have an L shape.

Cutting the collector may include: cutting the collector so that an individual electrode of the plurality of electrodes includes a portion of the first coating area having a first width, one of the fourth coating areas of the plurality of fourth coating areas connected to the portion of the first coating area and having a second width that is less than the first width, and a portion of the second coating area connected to the one of fourth coating areas of the plurality of fourth coating areas and having the second width; or cutting the collector so that an individual electrode of the plurality of electrodes includes a portion of the third coating area having a first width, one of the fifth coating area of the plurality of fifth coating areas connected to the portion of the third coating area and having a second width that is less than the first width, and a portion of the second coating area connected to the one of the fifth coating areas of the plurality of fifth coating areas and having the second width.

Advantageous Effects

According to the present invention, the electrode having the irregular shape through the simple process while minimizing the amount of wasted electrode active material may be manufactured.

MODE FOR CARRYING OUT THE INVENTION

Hereinafter, a method for manufacturing an electrode according to the present invention will be described with reference to the accompanying drawings.

Method for Manufacturing Electrode

Figure 1:
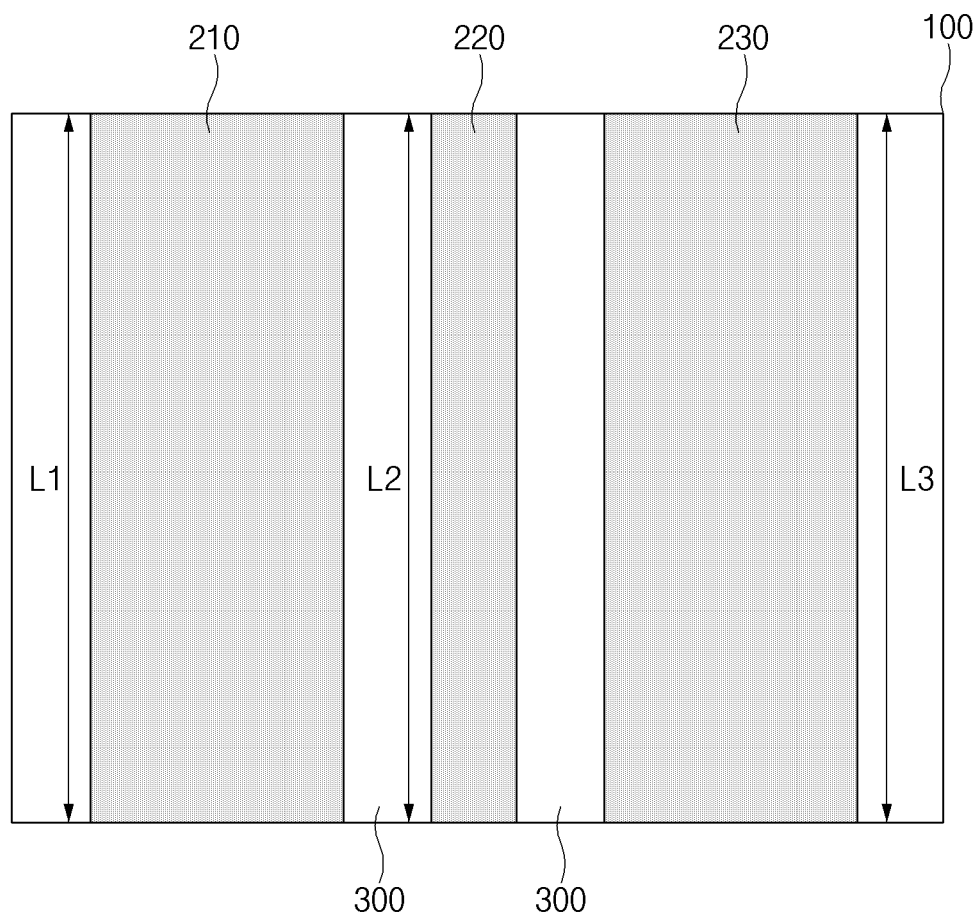
FIG. 1 is a plan view illustrating a state in which first to third coating areas are formed on a collector in a method for manufacturing an electrode according to the present invention.
Figure 2:
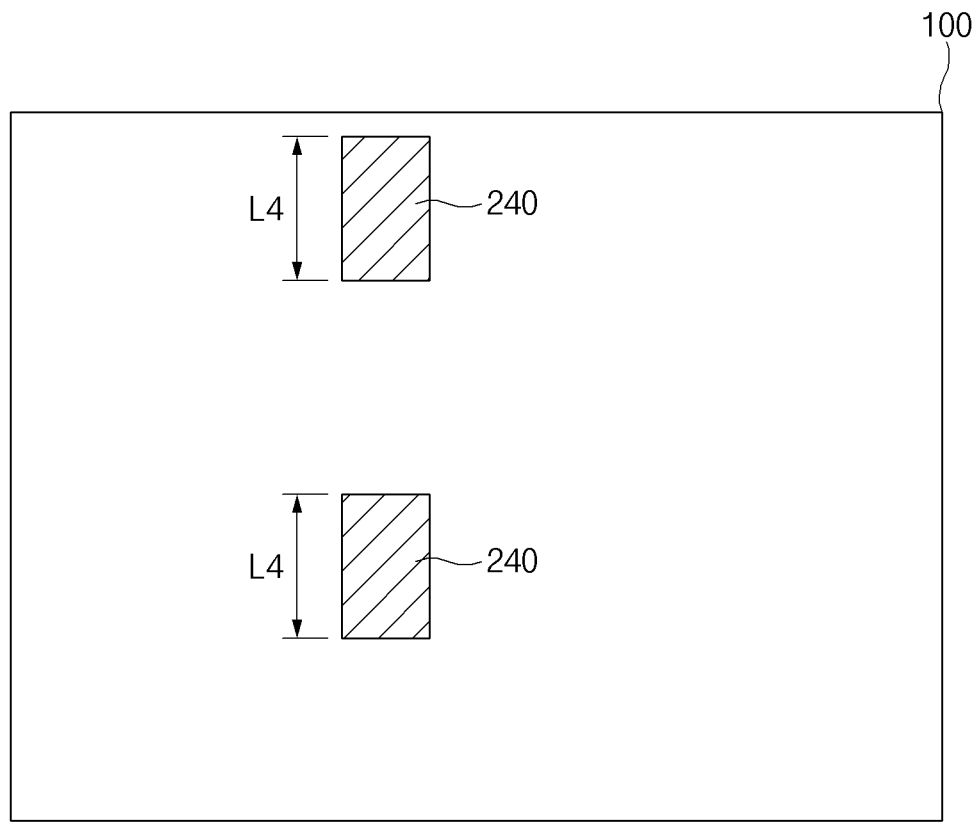
FIG. 2 is a plan view illustrating a state in which a fourth coating area is formed in the method for manufacturing the electrode according to the present invention.
Figure 3:
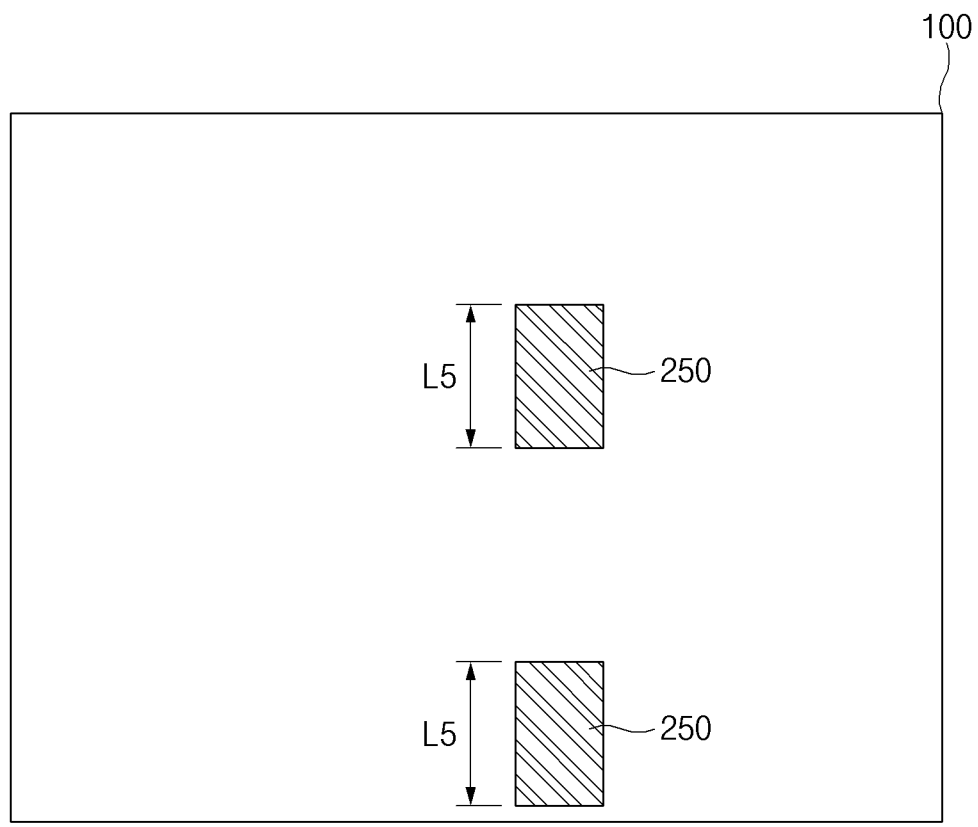
FIG. 3 is a plan view illustrating a state in which a fifth coating area is formed in the method for manufacturing the electrode according to the present invention.
Figure 4:
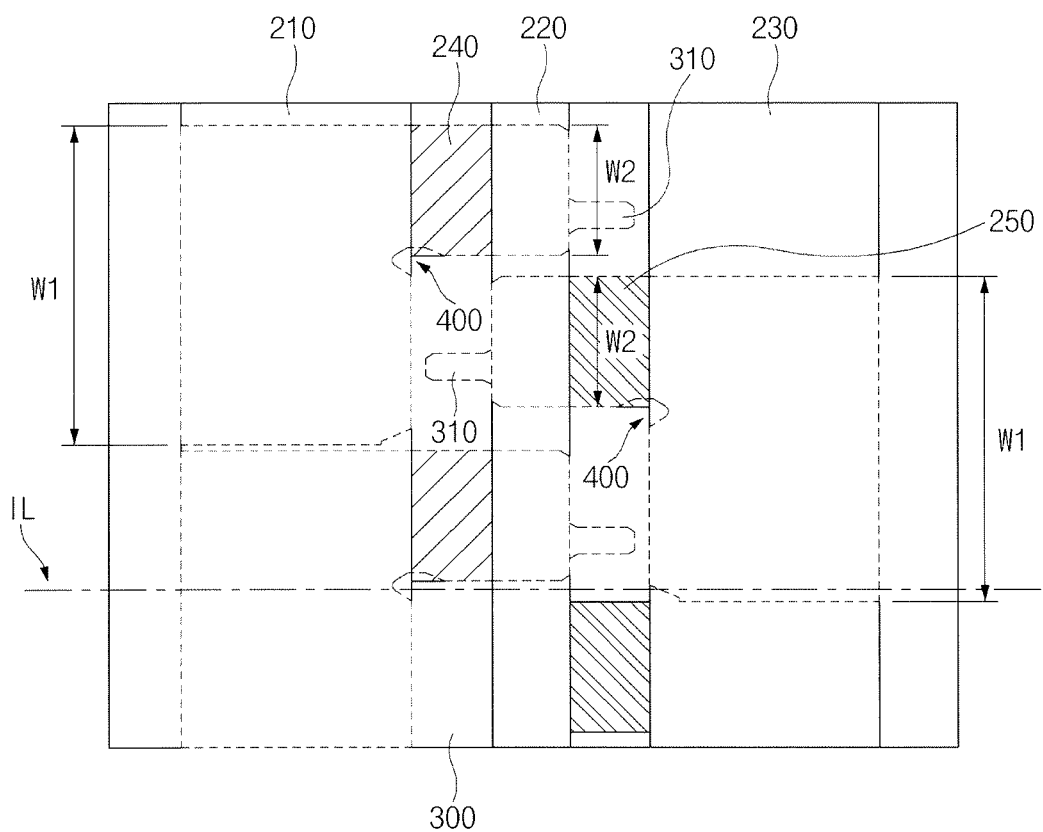
FIG. 4 is a plan view illustrating a state in which all the first to fifth coating areas are formed in the method for manufacturing the electrode according to the present invention.

FIG. 1 is a plan view illustrating a state in which first to third coating areas are formed on a collector in a method for manufacturing an electrode according to the present invention, FIG. 2 is a plan view illustrating a state in which a fourth coating area is formed in the method for manufacturing the electrode according to the present invention, FIG. 3 is a plan view illustrating a state in which a fifth coating area is formed in the method for manufacturing the electrode according to the present invention, and FIG. 4 is a plan view illustrating a state in which all the first to fifth coating areas are formed in the method for manufacturing the electrode according to the present invention.

Although the first to third coating areas, the fourth coating area, and the fifth coating area are formed on the collector in FIGS. 1 to 3, this is merely for convenience of description of the invention. Also, this does not show the order in which the first to fifth coating areas are formed in the method for manufacturing the electrode according to the present invention. That is, it should not be construed to include only the contents of the present invention, which are based on the configuration of the first to fifth coating areas illustrated in FIGS. 1 to 3, i.e., the state in which the first to third coating areas, the fourth coating area, and the fifth coating area are individually formed through separate processes.

Referring to the drawings based on the above contents, a method for manufacturing an electrode according to the present invention may include a collector preparation step of preparing a collector 100, a coating step of applying an electrode active material on a surface of the collector 100, and a cutting step of cutting the collector 100 to manufacture a plurality of electrodes. Hereinafter, an area of the surface of the collector 100, which is coated with the electrode active material may be divided and thus called first to fifth coating areas 210, 220, 230, 240, and 250. Hereinafter, the coating step in the method for manufacturing the electrode according to the present invention will be described in detail.

In the method for manufacturing the electrode according to the present invention, the coating step may include a process of forming the first to fifth coating areas 210, 220, 230, 240, and 250 on which the electrode active material is applied on the surface of the collector.

Here, as illustrated in FIG. 1, the first coating area 210 may have a first length L1. Similarly, the second coating area 220 and the third coating area 230 may have a second length L2 and a third length L3, respectively.

The first to third coating areas 210, 220, and 230 may be spaced apart from each other in a width direction of the collector 100. Also, the first coating area 210 and the third coating area 230 may have the same width, and the second coating area 220 of the first to third coating areas 210, 220, and 230 may have the smallest width. That is, each of the first coating area 210 and the third coating area 230 may have a width greater than that of the second coating area 220. However, unlike this configuration, the first to third coating areas 210, 220, and 230 may have the same width or may have widths different from each other.

Also, the first length L1 of the first coating area 210, the second length L2 of the second coating area 220, and the third length L3 of the third coating area 230 may correspond to each other. For example, the first length L1 of the first coating area 210, the second length L2 of the second coating area 220, and the third length L3 of the third coating area 230 may be the same. Here, that 'the first to third lengths correspond to each other' may mean that the first to third lengths are similar to each other or substantially the same.

Referring to FIGS. 2 and 4, the fourth coating area 240 may be formed between the first coating area 210 and the second coating area 220. Here, as illustrated in FIGS. 2 and 4, the fourth coating area 240 may be provided in plurality in a longitudinal direction of the collector 100 and be spaced apart from each other. Here, the fourth length L4 that is a length of one of the plurality of fourth coating areas 240 may be less than the first length L1 of the first coating area 210. Also, the plurality of fourth coating areas may have the same length.

Referring to FIGS. 3 and 4, the fifth coating area 250 may be formed between the second coating area 220 and the third coating area 230. Here, as illustrated in FIGS. 3 and 4, the fifth coating area 250 may be provided in plurality in a longitudinal direction of the collector 100 and be spaced apart from each other. Here, the fifth length L5 that is a length of one of the plurality of fifth coating areas 250 may be less than the third length L3 of the third coating area 230. Also, the plurality of fifth coating areas may have the same length.

Each of the plurality of fourth coating areas 240 may have the same shape and size as those of each of the fifth coating area 250. For example, each of plurality of fourth coating areas 240 may have the width and length L4 that are the same as the width and length L5 of each of the plurality of fifth coating areas 250.

In the coating step, the plurality of fourth coating areas 240 may be formed to be connected to the first coating area 210 and the second coating area 220. Similarly, in the coating step, the fifth coating area 250 may be formed to be connected to the second coating area 220 and the third coating area 230. Here, that the coating areas are connected to each other may be interpreted as a mean in which the coating areas are not spaced apart from each other.

Also, in the coating step, the plurality of fourth coating areas 240 and the fifth coating areas 250 may be formed to be dislocated from each other. In more detail, in the coating step of the method for manufacturing the electrode according to the present invention, the plurality of fourth coating areas 240 and the plurality of fifth coating areas 250 may be formed to be dislocated from each other when viewed from one side in a width direction of the collector 100. For example, the plurality of fourth coating areas 240 and the plurality of fifth coating areas 250 may be formed to be dislocated from each other without overlapping each other when viewed from one side in the width direction of the collector 100. Here, 'without overlapping each other' may mean that, when a virtual line IL (see FIG. 4) parallel to the width direction of the collector 100 is randomly drawn, the random virtual line IL does not pass through the plurality of fourth coating areas 240 and the plurality of fifth coating areas 250 at the same time.

As described above, the method for manufacturing the electrode according to the present invention may include the cutting step of cutting the collector 100 to manufacture the plurality of electrodes. Hereinafter, the cutting step of the method for manufacturing the electrode according to the present invention will be described in detail.

The cutting step may include a process of cutting the collector 100 so that the plurality of electrodes manufactured by the cutting step respectively include a portion of the two areas of the first to third coating areas 210, 220, and 230 and one of the plurality of fourth coating areas 240 or one the plurality of fifth coating areas 250. In FIG. 4, an example of a cutting line that is a line along which the collector is cut to manufacture the plurality of electrodes in the cutting step according to the present invention is illustrated as a dotted line. For example, as illustrated in FIG. 4, the cutting step may include a process of cutting the collector so that the plurality of electrodes include a portion of the first coating area 210, a portion of the second coating area 220, and one of the plurality of fourth coating areas 240 or include a portion of the second coating area 220, a portion of the third coating area 230, and one of the plurality of fifth coating areas 250.

According to the present invention, after the cutting step, the plurality of electrodes, each of which has an irregular shape, may be manufactured. Particularly, as described above, in the coating step, the plurality of fourth coating areas 240 may be connected to the first coating area 210 and the second coating area 220, and the plurality of fifth coating areas 250 may be connected to the second coating area 220 and the third coating area 230. Thus, in this case, the cutting step may include a process of cutting the collector so that the areas of the plurality of electrodes, which are coated with the electrode active material, have the L shape as illustrated in FIG. 4.

Particularly, each of the areas of the plurality of electrodes manufactured through the cutting step, which are coated with the electrode active material, may have a shape in which a large rectangle having a first width W1 and a small rectangle having a second width W2 less than the first width W1 are coupled to each other.

That is, the cutting step may include a process of cutting the collector 100 so that the plurality of electrodes include a portion of the first coating area 210 having the first width W1, one of the plurality of fourth coating areas 240 connected to the portion of the first coating area 210 and having a second width W2 less than the first width W1, and a portion of the second coating area 220 connected to one of the plurality of fourth coating areas 240 and having the second width W2. In this case, in the plurality of electrodes, the large rectangle having the first width W1 is a portion of the first coating area 210 having the first width W1, and the small rectangle having the second width W2 has a shape in which one of the plurality of fourth coating areas having the second width W2 and a portion of the second coating area 220 having the second width W2 are coupled to each other. The second width W2 may be the fourth length L4 that is a length of each of the plurality of above-described fourth coating areas 240.

Alternatively, the cutting step may include a process of cutting the collector 100 so that the plurality of electrodes include a portion of the third coating area 230 having the first width W1, one of the plurality of fifth coating areas 250 connected to the portion of the third coating area 230 and having the second width W2 less than the first width W1, and a portion of the second coating area 220 connected to one of the plurality of fourth coating areas 250 and having the second width W2. In this case, in the plurality of electrodes, the large rectangle having the first width W1 is a portion of the third coating area 230 having the first width W1, and the small rectangle having the second width W2 has a shape in which one of the plurality of fifth coating areas having the second width W2 and a portion of the second coating area 220 having the second width W2 are coupled to each other. The second width W2 may be the fifth length L5 that is a length of each of the plurality of above-described fifth coating areas 250.

However, unlike this, the cutting step may include a process of cutting the collector so that the plurality of electrodes has three widths. According to another embodiment of the present invention, the cutting step may include a process of cutting the collector 100 so that the plurality of electrodes include a portion of the first coating area 210 having a first width W1, one of the plurality of fourth coating areas 240 connected to the portion of the first coating area 210 and having a second width W2 less than the first width W1, and a portion of the second coating area 220 connected to one of the plurality of fourth coating areas 240 and having the third width W3 (not shown) less than the second width W2. Also, according to another embodiment of the present invention, the cutting step may include a process of cutting the collector 100 so that the plurality of electrodes include a portion of the third coating area 230 having a first width W1, one of the plurality of fifth coating areas 250 connected to the portion of the third coating area 230 and having a second width W2 less than the first width W1, and a portion of the second coating area 220 connected to one of the plurality of fourth coating areas 250 and having the third width W3 (not shown) less than the second width W2. The plurality of electrodes manufactured according to another embodiment of the present invention may have a stair shape in which a plurality of stepped portions are formed.

It is necessary to form an electrode tab on the manufactured electrode. The electrode tab formed on the electrode is configured to electrically connect the electrode to the outside. When charging or discharging, current flows through the electrode tab.

For this, the cutting step of the present invention may include a process of cutting the collector to form a non-coating portion for serving as the electrode tab. That is, in the method for manufacturing the electrode according to the present invention, the cutting step may include a process of cutting the collector 100 so that the non-coating portion 310 which is not coated with the electrode active material is formed on the plurality of electrodes.

Here, after the cutting step, as illustrated in FIG. 4, the non-coating portion 310 may be formed from a non-coating area 300 between the first coating area 210 and the second coating area 220 or a non-coating area 300 between the second coating area 220 and the third coating area 230.

That is, as illustrated in FIG. 4, after the cutting step, the non-coating portion 310 may formed from the non-coating area 300 between the second coating area 220 and the third coating area 230 when the plurality of electrodes include a portion of the first coating area 210, a portion of the second coating area 220, and one of the plurality of fourth coating areas 240 and may formed from the non-coating area 300 between the first coating area 210 and the second coating area 220 when the plurality of electrodes include a portion of the second coating area 220, a portion of the third coating area 230, and one of the plurality of fifth coating areas 250.

The plurality of electrodes manufactured by the method for manufacturing the electrode according to the present invention may be coated with the electrode active material on all the areas thereof except for the non-coating portion. That is, in the method for manufacturing the electrode according to the present invention, the cutting step may include a process of cutting the collector so that the electrode active material is applied to all areas of the plurality of electrodes except for the non-coating portion 310. Here, that 'the electrode active material is applied to all the areas of the plurality of electrodes 310 except for the non-coating portion 310' may be interpreted as a mean in which the electrode active material is applied to both entire surfaces of the plurality of electrodes except for the non-coating portion, but may not mean that the electrode active material has to be applied even to a thickness area of the plurality of electrodes.

As illustrated in FIG. 4, a recess part 400 may be formed in the plurality of electrodes manufactured through the method for manufacturing the electrode according to the present invention. Here, the recess part 400 may be formed in an area on which the first coating area 210 and the plurality of fourth coating areas 240 are connected to each other or an area on which the third coating area 230 and the plurality of fifth coating areas 250 are connected to each other.

In more detail, when the plurality of electrodes include a portion of the first coating area 210, a portion of the second coating area 220, and one of the plurality of fourth coating areas 240, the recess part 400 may have a shape that is recessed toward the first coating area 210. When the plurality of electrodes include a portion of the second coating area 220, a portion of the third coating area 230, and one of the plurality of fifth coating area 250, the recess part 400 may have a shape that is recessed toward the third coating area 230. The recess part 400 may be formed through the cutting step.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode, the method comprising:
   preparing a collector;
   applying an electrode active material on a surface of the collector; and
   cutting the collector to manufacture a plurality of electrodes,
   wherein applying the electrode active material includes:
   forming a first coating area, a second coating area, and a third coating area on the collector, the first coating area having a first length, the second coating area having a second length, the third coating area having a third length, each of the first to third lengths being substantially equal to each other, and the first to third coating areas are spaced apart from and parallel to each other in a width direction of the collector that is perpendicular to the first length;
   forming a plurality of fourth coating areas, each of which has a fourth length that is less than the first length of the first coating area and which are spaced apart from each other in a longitudinal direction of the collector that is perpendicular to the width direction of the collector and disposed between the first coating area and the second coating area; and
   forming a plurality of fifth coating areas, each of which has a fifth length that is less than the third length and which are spaced apart from each other in the longitudinal direction of the collector and disposed between the second coating area and the third coating area,
   wherein the plurality of fourth coating areas and the plurality of fifth coating areas are dislocated from each other when viewed from one side in the width direction of the collector,
   wherein, in forming the plurality of fourth coating areas, the plurality of fourth coating areas are connected to the first coating area and the second coating area such that the active material of the fourth coating areas contact the active material of the first coating area and the second coating area, and
   wherein, in forming the plurality of fifth coating areas, the plurality of fifth coating areas are connected to the second coating area and the third coating area such that the active material of the fifth coating areas contact the active material of the second coating area and the third coating area.

2. The method of claim 1, wherein, in cutting the collector, each of the electrodes of the plurality of electrodes comprises a portion of two areas of the first and second coating areas and one of the fourth coating areas of the plurality of fourth coating areas or a portion of two areas of the second and third coating areas and one of the fifth coating areas of the plurality of fifth coating areas.

3. The method of claim 2, wherein cutting the collector comprises cutting the collector so that a non-coating portion of the current collector which is not coated with the electrode active material is formed on the plurality of electrodes, and wherein the non-coating portion is formed from a non-coating area between the second coating area and the third coating area when an individual electrode of the plurality of electrodes comprises a portion of the first coating area, a portion of the second coating area, and the one of the fourth coating areas of the plurality of fourth coating areas and is formed from a non-coating area between the first coating area and the second coating area when the individual electrode of the plurality of electrodes comprises a portion of the second coating area, a portion of the third coating area, and the one of the fifth coating areas of the plurality of fifth coating areas.

4. The method of claim 3, cutting the collector comprises cutting the collector so that the plurality of electrodes are coated with the electrode active material on all areas thereof except for the non-coating portion.

5. The method of claim 2, wherein cutting the collector comprises:
- when individual electrodes of the plurality of electrodes comprise a portion of the first coating area, a portion of the second coating area, and the one of fourth coating areas of the plurality of fourth coating areas, cutting the collector so that a recess part is recessed toward the first coating area; and
- when individual electrodes of the plurality of electrodes comprise a portion of the second coating area, a portion of the third coating area, and one of fifth coating areas of the plurality of fifth coating area, cutting the collector so that a recess part is recessed toward the third coating area.

6. The method of claim 1, wherein cutting the collector comprises cutting the collector so that an area of each electrode of the plurality of electrodes, which are coated with the electrode active material, have an L shape.

7. The method of claim 6, wherein cutting the collector comprises:
- cutting the collector so that an individual electrode of the plurality of electrodes comprises a portion of the first coating area having a first width, one of the fourth coating areas of the plurality of fourth coating areas connected to the portion of the first coating area and having a second width that is less than the first width, and a portion of the second coating area connected to the one of the fourth coating areas of the plurality of fourth coating areas and having the second width; or
- cutting the collector so that an individual electrode of the plurality of electrodes comprises a portion of the third coating area having a first width, one of the fifth coating areas of the plurality of fifth coating areas connected to the portion of the third coating area and having a second width that is less than the first width, and a portion of the second coating area connected to the one of the fifth coating areas of the plurality of fifth coating areas and having the second width.

8. The method of claim 1, wherein each of the first coating area and the third coating area has a width greater than that of the second coating area.

* * * * *